July 18, 1961    L. F. MARTZ ET AL    2,992,559
RATIO TOTALIZERS PROVIDED WITH SQUARE ROOT EXTRACTING MEANS
Filed May 20, 1959    2 Sheets-Sheet 1

Lyle F. Martz
and
Forest L. Bush
INVENTORS

BY Gerald B. Tjoflat
Their Attorney

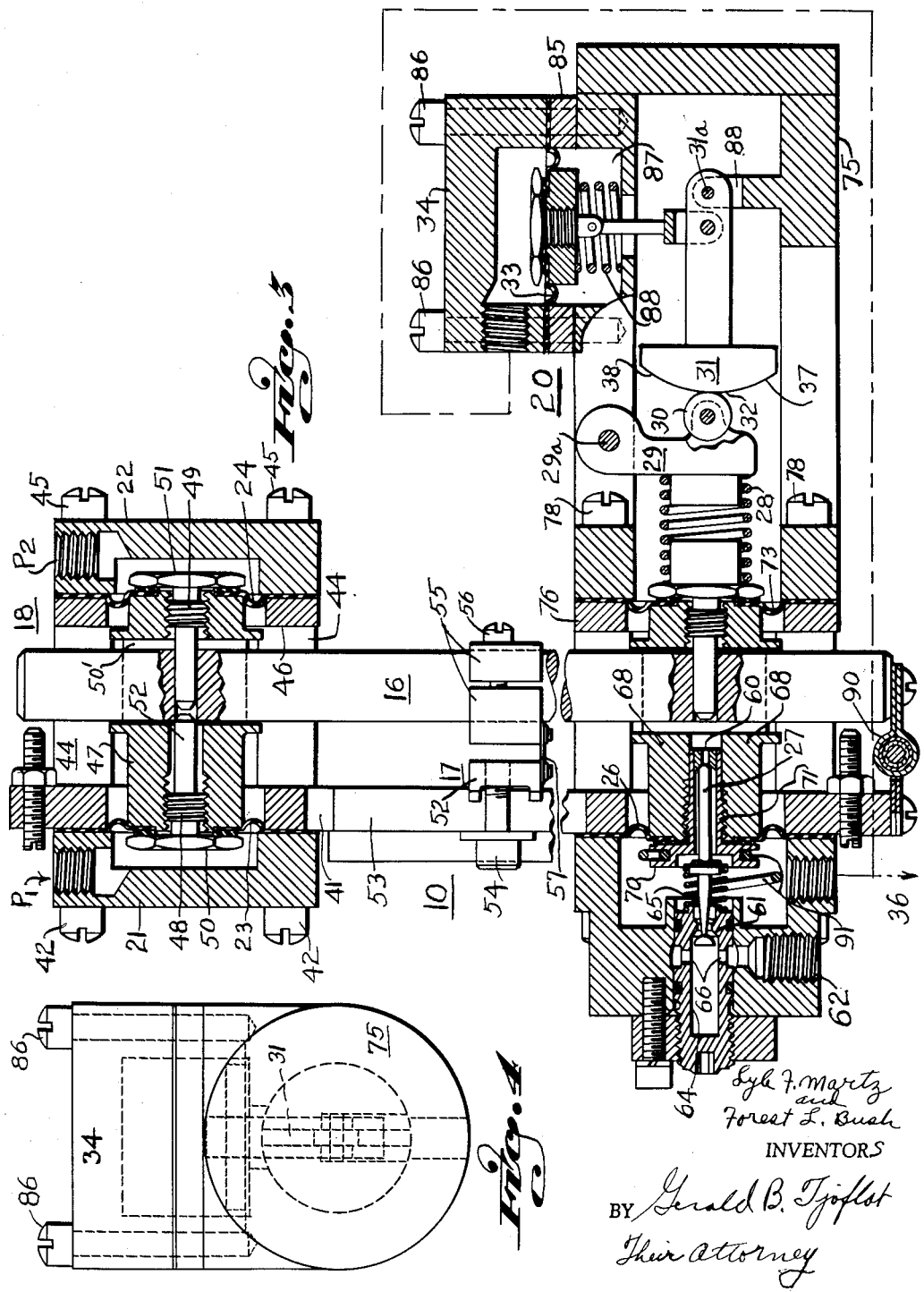

United States Patent Office 2,992,559
Patented July 18, 1961

2,992,559
RATIO TOTALIZERS PROVIDED WITH SQUARE ROOT EXTRACTING MEANS
Lyle F. Martz, Verona Pa., and Forest L. Bush, La Mirada, Calif., assignors to Hagan Chemicals and Controls Inc., Pittsburgh, Pa., a corporation of Pennsylvania
Filed May 20, 1959, Ser. No. 814,524
7 Claims. (Cl. 73—205)

This invention relates to pneumatic signal transmitters and more particularly to transmitters having means responsive to the flow of liquids or gases in a pipe or conduit and means for generating an output signal that is linearly proportional to such flows.

The flow of liquids or gases in a pipe line or conduit is usually sensed or measured by utilizing the pressure difference $(P1-P2)$ developed across an orifice in such pipe or conduit. The pressure difference $(P1-P2)$ is proportional to the square of the flow (F). Therefore, in order to generate a signal that is linearly proportional to the flow (F), means must be provided for extracting the square root of the pressure difference.

An object of this invention is to provide a ratio totalizer having a beam mounted on a fulcrum, means for developing and exerting a force on the beam that is proportional to a pressure differential, a signal output means disposed to exert a balancing force on the beam and means responsive to the signal output for exerting a modifying force that is added algebraically to the balancing force, the magnitude of which varies in such a manner as to cause the output signal to be linearly proportional to the flow producing the differential.

A further object is to provide a totalizer as in the preceding object in which the modifying force means develops a force having a parabolic characteristic which is proportional to $(x^2-100x=-100y)$ between the latus rectum and the vertex, where 0 to $100x$ is the range of the output signal and 0 to $100y$ is the range of the added parabolic force.

And a still further object is to provide a totalizer in which the ratio of the input differential force to the output signal may be modified.

The foregoing and other objects of the invention will be apparent to those of ordinary skill in the art to which the invention pertains, from the following description taken in conjunction with the acompanying drawings.

Figure 1:
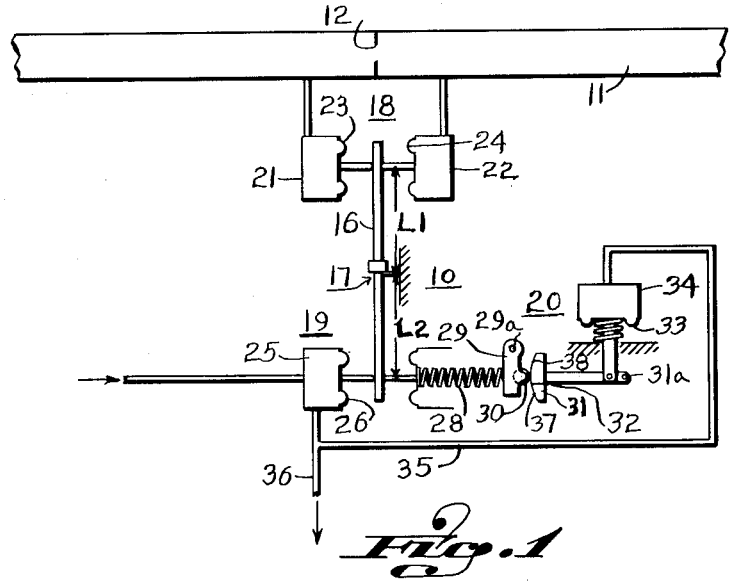
Figure 2:
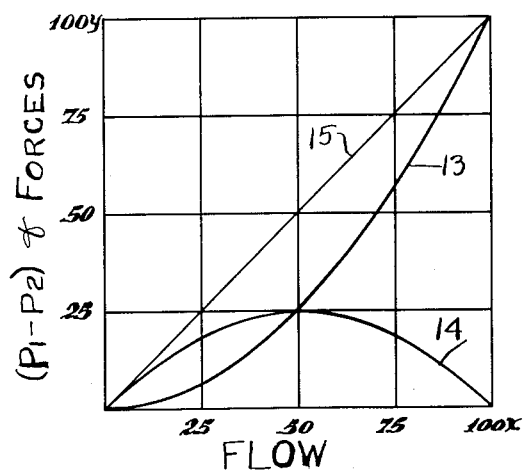

In the drawings:
FIGURE 1 is a more or less diagrammatic view of a pipe or conduit through which liquids, fluids or gases may flow and a totalizer arranged and constructed in accordance with the invention for measuring the pressure differential across an orifice and generating an output signal that is linearly proportional to the flow;
FIG. 2 is a view showing graphically the operating principle and the performance characteristics of the totalizer;
FIG. 3 is a view in longitudinal section of the totalizer showing a substantially practical embodiment of the invention; and
FIG. 4 is a view looking in the direction of the arrows 4—4 of FIG. 3.

In the drawings, FIGURE 1 illustrates schematically a totalizer or relay 10 embodying a form of the invention as applied to the measurement of flow (F) in a conduit or pipe line 11, and the generation of a signal that is linearly proportional to the flow (F), that flow being proportional to the square root of the pressure difference $(P1-P2)$ across an orifice 12 in the line 11.

FIGURE 2 shows graphically the performance characteristics of device 10. The $y$ ordinates represent the pressure differential $(P1-P2)$ as ranging from 0 to 100 and the abscissae $(x)$ represent the flow as ranging from 0 to 100, 100 being the maximum value. The $y$ ordinates also represent the force by which the $\sqrt{P1-P2}$ is obtained.

Curve 13 is parabolic in shape and represents the variation in flow with pressure differential $(P1-P2)$ as well a force that is developed by that differential. The curve is proportional to the square of the flow i.e. $y=kx^2$, or $(P1-P2)=K(F)^2$, where K is a constant.

Curve 14 represents a force whose magnitude varies parabolically, and which is derived from the output signal of device 10

As shown in FIG. 2, curve 14 is inverted with respect to the parabolic curve 13 and its origin is displaced to the right to the point $(P1-P2)=25$ and flow=50, or $y=25$ and $x=50$.

The forces represented by curves 13 and 14 are added algebraically by means responsive to the output signal of device 10 and so applied that the output signal is linear with flow as represented by curve 15, or proportional to the $\sqrt{P1-P2}$.

Device 10 comprises a beam 16 provided with an adjustable fulcrum 17 and pressure differential responsive means 18 that act at a distance L1 from the fulcrum and develop a turning moment about the same whose magnitude is proportional to $(P1-P2)L1$. Device 10 includes a pressure signal output and balancing means 19 that develops a counter turning moment about the fulcrum, and a means 20 that responds to the output signal means 20 and the balancing means 19 by joint action, develop a turning moment that opposes the turning moment of the pressure differential responsive means 18. The net force developed by means 19 and 20 is such that the output signal of means 19 is caused to be linearly proportional to the flow (F) or proportional to $\sqrt{P1-P2}$.

Means 18 comprises opposed pressure receiving bonnets or housings 21 and 22 having diaphragms 23 and 24, respectively, disposed to exert opposed forces on beam 16 at the distance L1 from the fulcrum 17. At values above zero, the differential $(P1-P2)$ develops a force whose turning moment is clockwise about the fulcrum.

The means 19 comprises a bonnet or housing 25 having a diaphragm 26 arranged to exert a force on the beam 16 at a distance L2 from the fulcrum and to generate a turning moment that is contra to, or opposes, the turning moment of the diaphragms 23 and 24. Housing 25 contains a valve 27 that is actuated by diaphragm 26 and the means 20 in such fashion that the pressure established in the housing by the valve (which is also the output signal or pressure) is linearly proportional to the flow (F).

Means 20 includes a compression spring 28 disposed between the diaphragm 26 and a pivoted lever 29 having a cam follower roller 30. The roller 30 is engaged by a cam 31 having a surface 32 of parabolic shape. It is to be observed that the shape of cam surface 32 is like the shape of curve 14 of FIG. 2. The cam 31 is actuated about its pivot 31a by a diaphragm 33. Diaphragm 33 is mounted in a housing 34 that receives the output signal of means 19 through a pipe or conduct 35. The signal is transmitted also by a pipe 36 to means for regulating, controlling or recording or regulating and recording the variable $(P1-P2)$ as the case may be.

When the output signal of means 19 is zero gauge, a point 37 on cam surface 32 engages the roller 30; therefore, the cam force is zero. Likewise, when a point 38 on that surface engages the cam follower roller 30, the output signal is at a maximum value but the cam force is zero. For intermediate positions of the cam, the force varies in accordance with the curve 14 and is a maximum at the mid position of the cam. It is also to be observed that the distance between points 37 and 38 along the cam surface depends upon the maximum stroke of the diaphragm 33 and its point of connection to the cam 31.

The force developed by diaphragm 26 varies in accordance with curve 13 (FIG. 2). Since the forces represented by curves 13 and 14 are added, the magnitude of the output signal of means 19 must be such as to balance the algebraic sum of those forces and the turning moment developed by the pressure difference means 18.

The details of construction of device 10 are shown more particularly in FIGS. 3 and 4. As there illustrated, the bonnet 21 clamps the marginal edge of the diaphragm 23 to a base or support member 41 by means of screws 42 that pass through the base and are threaded into spacers 44 to which the bonnet 22 is secured by means of screws 45. The marginal edge of the diaphragm 24 is clamped between the face of the bonnet 22 and a member 46 which is clamped also by the screws 45 to the spacers 44.

The central portions of the diaphragms 23 and 24 are secured and clamped to a rigid member 47 by means of screws 48 and 49 having relatively large flat heads 50 and 51, respectively. The beam 16, as shown, extends through an aperture in the member 47 and is secured thereto in any suitable manner, as by wedges or screws (not shown).

The screws 48 and 49 have extensions that are received in a bore 50' in the beam, thereby preventing endwise movement of the beam with reference to the member 47.

The fulcrum 17 comprises a base block 52 mounted across a slot 53 in the base and is secured thereto by a screw 54 having a head of sufficient width to span the slot 53, whereby the base block 52 may be clamped thereby to the base. The fulcrum also includes split blocks 55 that partially embrace and are clamped to beam 16 by means of screws 56. The fulcrum blocks are connected by a relatively thin spring 57 which forms the effective fulcrum and which is substantially frictionless.

Diaphragm 26 of means 19 is clamped at its marginal edges between the open end of the bonnet 25 and the base 53 and is secured thereto by screws 58 that pass through the base and are threaded into spacers 59. The valve 17 controls an exhaust port 60 and an inlet port 61 which is supplied with pressure, such as air pressure at constant value, through a supply port 62. The valve 27 is provided with a collar 63 between which and the inner end of a valve body 64 a light compression spring 65 is disposed. The valve body 64 is threaded into the bonnet as shown. The inlet port 61 of the valve is supplied through side ports 66 in the valve body.

The central portion of the diaphragm 26 is connected to the beam 16 by a rigid member 68 which is secured to the beam 16 by means of wedges or screws or other suitable means (not shown). The central portion of the diaphragm 26 is clamped to the adjacent end of the member 68 by means of a substantially flat head 70 of a hollow body 71 in which the exhaust port 60 is formed and which is threaded into member 68, as shown.

The means 20 is connected to the beam 16 by the rigid member 68. As shown, there is a diaphragm 73 between the inner end of a housing 75 and a clamp member 76. The inner end of member 75 is bolted by means of cap screws 78 to the member 76 and the spacers 59. The diaphragm 73 in the particular form of device illustrated does not respond to pressure and may be omitted, if desired.

The housing 75 supports the lever 29 and its cam follower 30, on a pin 29a. Between the lever 29 and the rigid member 68 is the compression spring 28. In order to accommodate the lever 31, the housing 75 is slotted at 75a and 75b.

The other end of the housing 75 is provided with an annular boss 80 between which and the bonnet 34 the marginal edge of the diaphragm 33 is clamped by means of screws 81. The boss 80 of the housing 75 is provided with a well 82 to accommodate a compression spring 83 that biases the diaphragm upwardly.

When the pressure difference $(P1-P2)$ increases from zero, beam 16 is subjected to a clockwise turning moment, whereby the beam 16 moves the valve stem 17 to the left as seen in FIG. 3 uncovering the inlet port 61 but keeping the exhaust port 60 closed. Pressure is thereby admitted into the bonnet 25. That pressure acts on the diaphragm 26 which develops a force that resists the turning moment of the force of the pressure difference $(P1-P2)$. The pressure developed in the bonnet 25 is transmitted to the diaphragm chamber of bonnet 34 causing the diaphragm 53 to move downwardly whereby the cam 31 is rotated counterclockwise about its pivot.

If it be assumed that before the pressure differential $(P1-P2)$ changed, the difference were zero, the cam 31 would be in a position where the roller 30 engages point 37 on the cam. Therefore, as the pressure difference increases, the cam rotates counterclockwise thereby compressing the spring 28 and exerting a force which is additive to the force produced by the presure differential $(P1-P2)$ and opposed to that produced by thhe force of the pressure on the diaphragm 26. Consequently, an output pressure is developed in the bonnet 25 that is linear with the pressure difference $(P1-P2)$. In other words, the operation starts at the zero or origin of FIG. 2. As the pressure difference $(P1-P2)$ increases from zero, the cam position and the cam force is represented by the curve 14 and the force exerted on beam 16 by the pressure difference on diaphragms 23 and 24, is represented by adding the ordinates of these curves. Thus, a straight line curve results represented by curve 15. The curve 15 shows that the resultant force produced by the pressure difference means 18 and the cam 31 are linear with flow. In other words, the means 20 has extracted the square root of the pressure difference $(P1-P2)$. The maximum effect of the cam 31 as designed occurs at 50% of total flow 100x. From 50% flow to 100% flow, the force developed by cam 31 decreases to zero. The sum of the ordinates of the curves 13 and 14 from the point represented by 50% of flow results in the straight line curve 15 from the origin at zero to 100% of pressure difference.

The device 10 may be stabilized by employing a stabilizing damper 90.

The particular design of totalizer shown up to and including the means 20 may be of the form shown in the copending application of Edwin A. Cunningham, Jr., Serial No. 796,637, filed March 2, 1959. That device, and as illustrated in FIG. 3, includes a bias spring 91 which may be adjusted from the outside of the bonnet 25 without disturbing the inner assembly to provide either a negative or a positive bias to the diaphragm 26. By positive bias is meant that the spring urges the diaphragm 26 in a direction to open the inlet port of the valve 27. Thus, the output pressure in line 36 may be adjusted to any desired value at the pressure difference $(P1-P2)$ is equal to zero. By negative bias is meant that the spring 91 is adjusted to urge the diaphragm 26 outwardly so as to uncover the exhaust port 60. In that case, the output pressure in line 36 will remain at zero until the pressure difference $(P1-P2)$ has increased to a predetermined value.

Having thus described the invention, it will be apparent to those of ordinary skill in the art to which the invention pertains, that various modifications and changes may be made in the illustrated embodiment without departing from either the spirit or the scope of the invention.

Therefore, what is claimed as new and desired to be secured by Letters Patent is:

1. A totalizer disposed to respond to a pressure difference developed across an orifice in a conduit through which fluid, liquid or gases flow, and provided with means for generating a pneumatic signal that is linearly proportional to the flow, said totalizer comprising a beam mounted on a fulcrum and provided with means at one side of the same for exerting a force on the beam that is proportional to the pressure difference across the orifice, valve means actuated by said beam for developing a pneumatic pressure, means responsive to said pneumatic pressure for developing a force opposing the pressure differential force and which varies in accordance with the square of said flow, and a second means responsive to said pneumatic pressure for generating a force that varies parabolically and acts on said beam at the same location as the pneumatic pressure responsive means acts on said beam, the parabola of the latter mentioned force being inverted with reference to the parabola of said pressure differential force and having its origin shifted into the first quadrant of said first parabola, whereby the combined forces of said two mentioned means develop a force on the beam that is represented by the expression $(-100y = x^2 - 100x)$ where the pneumatic pressure developed by said pneumatic signal generating means varies from zero to $100x$ and zero to $100y$ equals the force generated by said second mentioned signal responsive means.

2. A totalizer as in claim 1 in which the second mentioned pneumatic signal responsive means comprises a cam and a follower and a yielding means between the follower and the beam for exerting a force thereon at the same distance from the beam fulcrum as the pneumatic signal responsive means acts thereon, said cam having an inverted parabolic cam surface, and a pneumatic signal actuator for actuating the cam through a stroke corresponding to a range from zero to maximum output pneumatic signal, the parabola of the cam surface being so located that it exerts substantially zero force at zero and maximum values of the pneumatic signal and maximum force at substantially 50% of said stroke, whereby the combined forces of said signal responsive means and said cam causes the signal output to vary as the square root of the flow pressure differential and linearly with said flow.

3. A totalizer as in claim 2 in which the pressure differential force producing means acts at a distance L1 from the fulcrum and the cam force and the pneumatic signal force act on the beam at a distance L2 from the same, and that means are provided for adjusting the fulcrum along the beam so as to adjust the ratio of L1 to L2.

4. A totalizer as in claim 1 in which the pneumatic signal and signal responsive force producing means comprise a bonnet having an open end and the force producing means comprises a diaphragm extending across said open end, the bonnet having a valve which includes an inlet valve port, an exhaust port in the diaphragm and a valve stem actuated by the diaphragm to control said ports and that adjustable means are provided for applying a bias to said diaphragm that can be varied from negative to positive.

5. In combination, a valve assembly comprising a housing having a supply port for pneumatic pressure of substantially constant value, an inlet valve port seat, a diaphragm provided with an exhaust valve assembly having an exhaust port seat for communicating the interior of the housing with the atmosphere, a valve stem having a valve at one end for controlling the inlet port seat, the other end of which controls the exhaust port seat, said inlet and exhaust ports being closed by the stem when the diaphragm is in neutral position, means for applying a variable external force to said diaphragm that varies as the square of a variable, to actuate the valve stem to unseat the inlet port seat as the applied force increases to move the diaphragm in one direction from said neutral position while keeping the exhaust port closed and opening the exhaust port and keeping the inlet seat port closed as the diaphragm moves in the opposite direction from neutral, the diaphragm being in neutral when the external force applied thereto is equal to the force of the pressure on said diaphragm, and means responsive to the pressure in said housing for applying a parabolically varying force in algebraically additive relation to said diaphragm force, said means comprising a cam yieldingly connected to said diaphragm and so disposed as to exert minimum forces at minimum and maximum values of the first-mentioned externally applied force and a maximum force at substantially the mid point between said minimum forces, and diaphragm means responsive to said housing pressure for actuating said cam.

6. A square rooting totalizer comprising a beam mounted on a fulcrum and having at one side of the fulcrum opposed pressure input receivers, each of which includes a flexible member connected to the beam so as to develop a turning moment about the fulcrum that is proportional to the difference between the forces developed by the received pressures on said diaphragms, a pressure generating means located at the opposite side of the fulcrum and including valve means actuated by motion of the beam for developing a pneumatic pressure and a flexible member responsive to said pneumatic pressure and connected to said beam to exert a force proportional to said pressure and develop a turning moment opposing the turning moment of said opposed pressure input receivers, said turning moment being linearly proportional to said pressure difference, and a force generating means responsive to said generated pneumatic pressure, said force generating means comprising a lever pivoted at one end so as to rotate towards and away from the beam at the location where said pneumatic pressure responsive diaphragm acts thereon, a yielding means between said lever and said beam, a cam follower on said lever and a cam lever mounted on a pivot so as to rotate at right angles to the line of action of said yielding means and having an inverted parabolic cam surface disposed to engage said follower, a flexible member connected to said cam lever and responsive to said pneumatic pressure, the cam surface developing a force that varies from zero to a maximum to zero as the pressure difference on said input receivers varies from zero to a maximum.

7. A totalizer as in claim 6 in which means are provided for imposing a bias on said flexible member that responds to the pneumatic pressure together with means for adjusting said bias means from negative to positive values.

References Cited in the file of this patent
UNITED STATES PATENTS

| | | |
|---|---|---|
| 2,296,714 | Ibbott | Sept. 22, 1942 |
| 2,408,685 | Rosenberger | Oct. 1, 1946 |
| 2,672,151 | Newbold | Mar. 16, 1954 |